United States Patent
Mathes et al.

(10) Patent No.: US 6,401,455 B1
(45) Date of Patent: Jun. 11, 2002

(54) EXHAUST EMISSION CONTROL SYSTEM FOR THE EXHAUST GAS OF A DIESEL ENGINE

(75) Inventors: Wieland Mathes, Michelau (DE); Frank Witzel, Bloomfield Hills, MI (US); Steffen Schnapp, Marktgraitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/491,118

(22) Filed: Jan. 24, 2000

Related U.S. Application Data

(63) Continuation of application No. PCT/DE98/02048, filed on Jul. 21, 1998.

(30) Foreign Application Priority Data

Jul. 24, 1997 (DE) .......................... 197 31 865

(51) Int. Cl.$^7$ ................................. F01N 3/00
(52) U.S. Cl. .................... 60/286; 60/295; 60/303; 423/235; 423/239.1
(58) Field of Search .............. 60/274, 286, 295, 60/296, 299, 300, 309, 324; 423/212, 239.1, 235

(56) References Cited

U.S. PATENT DOCUMENTS

| | | | | |
|---|---|---|---|---|
| 4,530,418 A | * | 7/1985 | Currie ........................ | 181/227 |
| 4,672,809 A | * | 6/1987 | Cornelison et al. ........... | 60/286 |
| 4,719,090 A | * | 1/1988 | Masaki ....................... | 422/310 |
| 5,209,062 A | * | 5/1993 | Vollenweider ............... | 60/280 |
| 5,542,249 A | * | 8/1996 | Health ........................ | 60/293 |
| 5,628,186 A | * | 5/1997 | Schmelz ...................... | 60/274 |
| 5,809,774 A | * | 9/1998 | Peter-Hoblyn et al. ....... | 60/274 |
| 5,820,832 A | * | 10/1998 | Huttenhofer et al. ....... | 422/171 |
| 5,968,464 A | * | 10/1999 | Peter-Hoblyn et al. ..... | 423/235 |
| 6,173,568 B1 | * | 1/2001 | Zurbig et al. ................. | 60/274 |
| 6,203,770 B1 | * | 3/2001 | Peter-Hoblyn et al. ..... | 423/212 |

FOREIGN PATENT DOCUMENTS

| | | |
|---|---|---|
| DE | 3642612 A1 | 6/1988 |
| DE | 4203807 A1 | 8/1993 |
| EP | 0558452 A1 | 9/1993 |
| EP | 0 594 657 B1 | 11/1996 |

OTHER PUBLICATIONS

Published International Application No. 93/00990 (Berner et al.), dated Jan. 21, 1993.
"SiNOx Stickoxidminderung für stationäre Dieselmotoren", Siemens Energieerzeugung, order No. A96001–U91–232.

* cited by examiner

Primary Examiner—Thomas Denion
Assistant Examiner—Binh Tran
(74) Attorney, Agent, or Firm—Laurence A. Greenberg; Werner H. Stemer; Ralph E. Locher

(57) ABSTRACT

An injection device for a reducing agent, a mixing device and a catalyst device are provided in an exhaust pipe. The mixing device is disposed upstream of the injection device as seen in the direction of flow of the exhaust gas. An exhaust gas inlet pipe is connected to the exhaust pipe along the main axis of the exhaust pipe. A first level of the catalyst device may advantageously be a hydrolysis-catalyst module, while the other levels may be SCR catalyst modules.

3 Claims, 2 Drawing Sheets

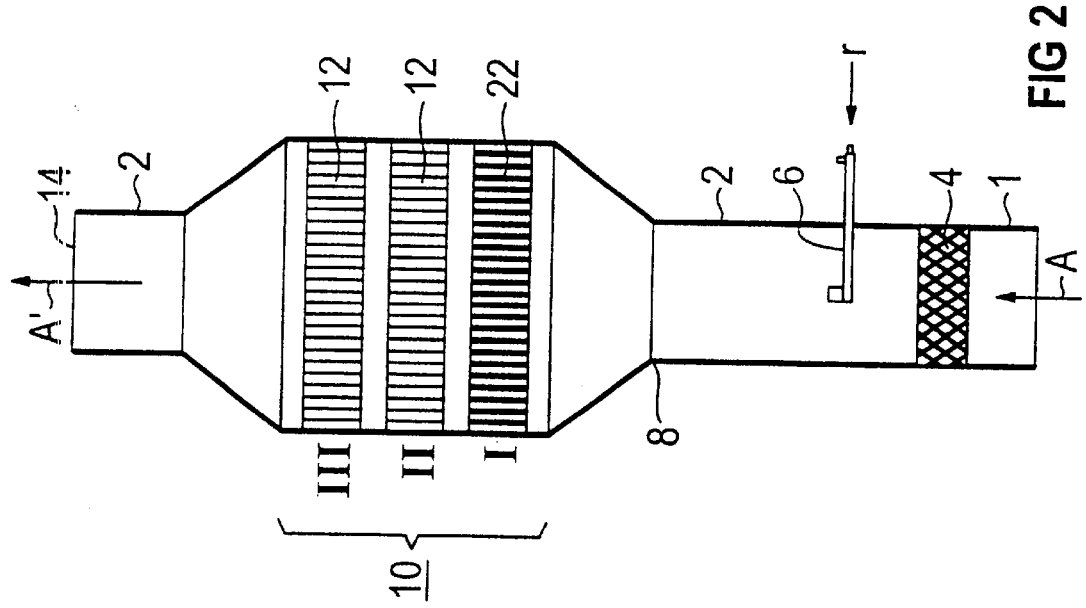
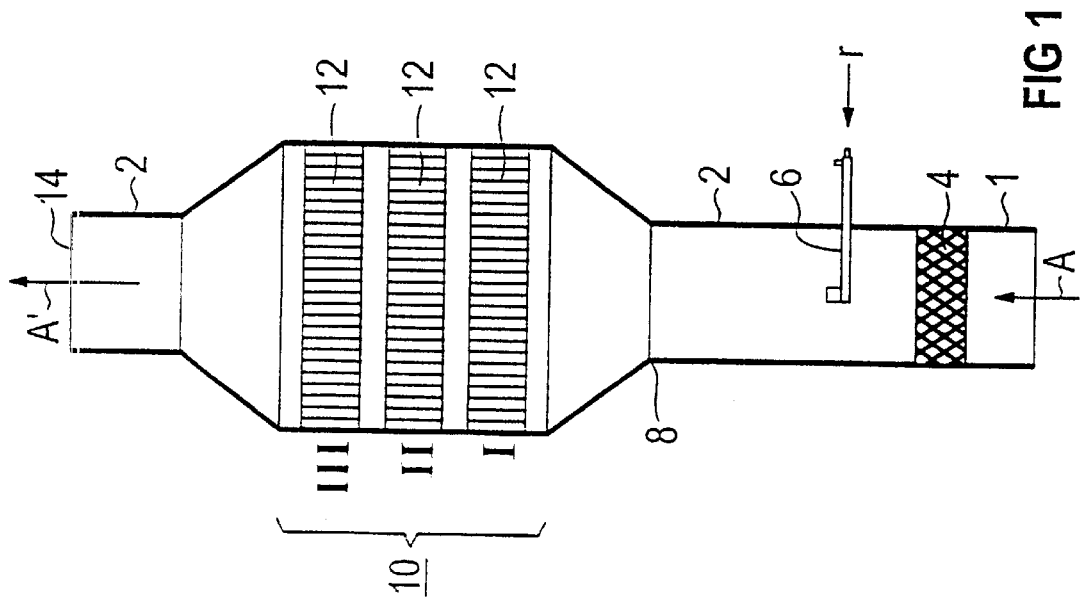

EXHAUST EMISSION CONTROL SYSTEM FOR THE EXHAUST GAS OF A DIESEL ENGINE

CROSS-REFERENCE TO RELATED APPLICATION

This application is a continuation of copending International Application No. PCT/DE98/02048, filed Jul. 21, 1998, which designated the United States.

BACKGROUND OF THE INVENTION

Field of the Invention

The invention relates to an exhaust emission control system for the exhaust gas of a diesel engine, in which an injection device for a reducing agent, a mixing device and a catalyst device are disposed in an exhaust pipe.

A system of the type mentioned above is sold under the name SiNOx exhaust emission control system by the Siemens AG company, Berlin and Munich, Germany and is described in the company brochure "SiNOx Stickoxidminderung für stationäre Dieselmotoren" (SiNOx nitrogen oxide reduction for stationary diesel engines), order number A96001-U91-A232. With such a system, the nitrogen oxide emission of a diesel engine can be drastically reduced. The mode of operation of the SiNOx exhaust emission control system is based on the SCR method (Selective Catalytic Reduction). In this case, the nitrogen oxides of the exhaust gas are mixed with a reducing agent, such as ammonia or urea, in the exhaust pipe, passed into a reactor space and converted there at the catalyst device to the environmentally harmless substances hydrogen and nitrogen. A static mixer is used for mixing the reducing agent with the exhaust gas.

From the European patent EP 0 558 452 B1 it is known to dispose in a compactly constructed exhaust emission control system three channels one behind the other, namely a pyrolysis channel, a mixing channel and a reaction channel. In the pyrolysis channel there is a two-component nozzle unit, with which aqueous urea solution is injected with compressed air into the exhaust gas stream. Here the pyrolysis takes place, i.e. the breakdown of the urea into ammonia and carbon dioxide. In the mixing channel there are three cross mixers, which provide a thorough mixing of the various substances. The thoroughly mixed exhaust gas stream is then directed into the reaction channel, where it is passed through two reduction (SCR) catalysts and then through an oxidation catalyst. After the gaseous pollutants have been eliminated, the exhaust gas stream is discharged to the outside.

When there are confined installation conditions for SiNOx diesel exhaust emission control systems, specifically in the case of land vehicles such as trucks, passenger cars, buses or locomotives, but also in the case of ocean-going vessels, such as surface vessels, ensuring an even distribution of the reducing agent in the exhaust gas proves to be a problem. This is because curves in the exhaust pipe cause an uneven distribution of the exhaust gas flow, that is to say a one-sided flow profile, and consequently an uneven distribution of the injected reducing agent. When there is a short atomizing distance due to a very small structural space, the dwell time of the reducing agent in the exhaust gas stream is not sufficient to ensure an even distribution before entry into the SCR catalyst device. As a result, the individual levels or modules in the catalyst device are subjected unevenly to the reducing agent, which results in a relatively low conversion of nitrogen oxides.

The published German patent application DE 42 03 807 A1 discloses an exhaust emission control system in which an exhaust gas inlet pipe is provided perpendicularly with respect to the main axis of an exhaust pipe. An injection device for a reducing agent, a mixing device and a catalyst device are provided in the exhaust pipe. The mixing device is provided upstream of the injection device—seen in the direction of flow of the exhaust gas. The exhaust gas inlet pipe connected perpendicularly with respect to the main axis of the exhaust pipe has the effect that the exhaust gas is introduced tangentially into the exhaust pipe. The resultant swirl in the exhaust gas is utilised through the use of the mixing device for mixing the exhaust gas with the reducing agent introduced via the injection device. However, a swirl of this kind, resulting from the tangential introduction of the exhaust gas, disadvantageously leads to an uneven distribution of the exhaust gas along the radial direction.

The extent to which a thorough mixing of the exhaust gas with the reducing agent can be achieved is unsatisfactory, especially as the injection device is provided centrally in the middle of the exhaust pipe.

SUMMARY OF THE INVENTION

It is accordingly an object of the invention to provide an exhaust emission control system which overcomes the above-mentioned disadvantages of the heretofore-known systems of this general type and which, while having a short atomizing distance, ensures an even distribution of the reducing agent in the exhaust gas.

With the foregoing and other objects in view there is provided, in accordance with the invention, an exhaust emission control system for an exhaust gas of a diesel engine, including an exhaust pipe having a main axis; an exhaust gas inlet pipe aligned along the main axis of the exhaust pipe and connected to the exhaust pipe for receiving an exhaust gas having a flow direction; an injection device disposed in the exhaust pipe for injecting a reducing agent; a mixing device disposed in the exhaust pipe upstream of the injection device, as seen in the flow direction of the exhaust gas; and a catalyst device disposed in the exhaust pipe.

The object of the invention is achieved by the exhaust gas inlet pipe being aligned along the main axis of the exhaust pipe. In other words, no deflection of exhaust gas takes place when it flows through the exhaust gas inlet pipe into the exhaust pipe. The exhaust gas is introduced parallel to the exhaust pipe.

In accordance with another feature of the invention, the catalyst device may include a plurality of levels, each of which is an SCR catalyst module. Alternatively, however, the catalyst device may also include a plurality of levels of which the first level is a hydrolysis-catalyst module and every further level is an SCR catalyst module.

In order to further improve the mixing, a further mixing device can be provided between the injection device and the catalyst device.

This further mixing device is preferably provided at a point at which the exhaust pipe widens for receiving the catalyst device.

Other features which are considered as characteristic for the invention are set forth in the appended claims.

Although the invention is illustrated and described herein as embodied in an exhaust emission control system for the exhaust gas of a diesel engine, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

FIG. 1 is a cross-sectional view of a first exhaust emission control system having the exhaust gas inlet pipe disposed along the main axis of the exhaust pipe and using three SCR catalyst module levels;

FIG. 2 is a cross-sectional view of a second exhaust emission control system having the exhaust gas inlet pipe disposed along the main axis of the exhaust pipe and using one hydrolysis-catalyst module level and two subsequent SCR catalyst module levels.

DESCRIPTION OF THE PREFERRED EMBODIMENTS

Figure 3:
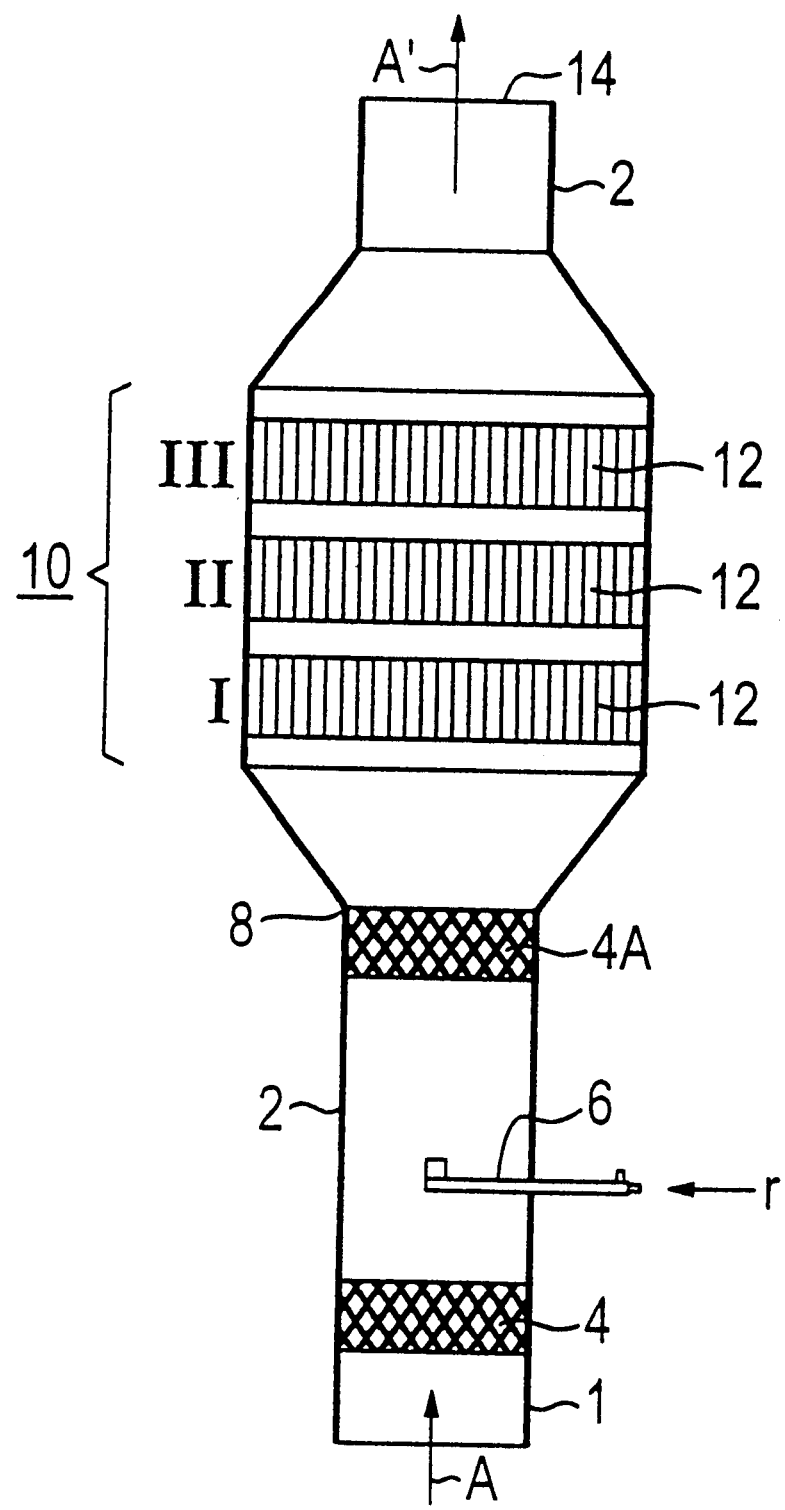
FIG. 3 is a cross-sectional view of a third exhaust emission control system having a further mixing device, in addition to the mixing device as shown in FIG. 1.

Referring now to the figures of the drawings in detail and first, particularly, to FIG. 1 thereof, there is shown an exhaust emission control system. An exhaust gas A is emitted from a diesel engine, which is not shown, and is directed, for example via a compressor or turbo-generator, which are also not shown, into an exhaust gas inlet pipe 1 and into an exhaust pipe 2 connected thereto. The exhaust gas inlet pipe 1 is aligned along the main axis of the exhaust pipe 2. A deflection or diversion of the exhaust gas does not take place. In the exhaust pipe 2 there is a static mixing device 4 which may be embodied in particular according to the mixing device described in the European patent document EP 0 594 657. Provided downstream in the direction of flow is an injection device 6 for a reducing agent r. This reducing agent may be ammonia ($NH_3$), and may in particular be an aqueous solution of urea. At a transitional point or transitional region 8, the exhaust pipe 2 widens for receiving a catalyst device 10. This catalyst device 10 in this case includes three levels I, II, and III disposed one above the other. Each of these levels I, II, and III is an SCR catalyst module 12 and serves for the elimination of nitrogen oxides ($NO_x$) in the exhaust gas A. The purified exhaust gas A' leaves the exhaust pipe 2 via an outlet opening 14.

In comparison with the prior art, the exhaust emission control system represented in FIG. 1 results in an improvement in the even distribution of the flow and the even distribution of the reducing agent.

According to FIG. 2, a second exhaust emission control system, which in the lower region corresponds to that of FIG. 1, is provided. By contrast with FIG. 1, here the first level I is configured as a hydrolysis-catalyst module 22. Here too, an improvement over the prior art in the even distribution of the flow and reducing agent can be accomplished. In addition, a reduction in the required structural space or mounting space can be achieved.

The third exhaust emission control system, according to FIG. 3, largely corresponds to that shown in FIG. 1. In addition, a further mixing device 4A is provided here. The further mixing device 4A is preferably disposed at the transitional point or transitional region 8, which is upstream of the widening transition from the cylindrical exhaust pipe 2 into the catalyst reactor space.

In the case of the embodiment according to FIG. 3, an improvement over the prior art in the even distribution of the flow and reducing agent and a reduction in the structural space or mounting space are achieved. In addition, a widening of the flow is obtained, since the mixers 4A and 4, respectively, act as baffles.

We claim:

1. An exhaust emission control system for an exhaust gas of a diesel engine, comprising:

an exhaust pipe having a main axis;

an exhaust gas inlet pipe aligned along said main axis of said exhaust pipe and connected to said exhaust pipe for receiving an exhaust gas having a flow direction;

an injection device disposed in said exhaust pipe for injecting a reducing agent;

a mixing device disposed in said exhaust pipe entirely upstream of said injection device, as seen in the flow direction of the exhaust gas;

a catalyst device disposed in said exhaust pipe externally to said mixing device; and a further mixing device disposed between said injection device and said catalyst device;

said exhaust pipe extending along said main axis upstream of said injection device and extending along said main axis downstream of said injection device;

said exhaust pipe having a widened region for receiving said catalyst device and a transitional region adjacent said widened region; and said further mixing device being disposed at said transitional region.

2. The exhaust emission control system according to claim 1, wherein said catalyst device includes a plurality of levels, each of said levels includes an SCR catalyst module.

3. The exhaust emission control system according to claim 1, wherein said catalyst device includes a first level having a hydrolysis-catalyst module and includes further levels having respective SCR catalyst modules.

* * * * *